United States Patent [19]

Jacottet

[11] Patent Number: 4,463,838

[45] Date of Patent: Aug. 7, 1984

[54] VIBRATION JACKS

[75] Inventor: Jean-Louis Jacottet, Elevage moderne de Crotteau, France

[73] Assignee: Etablissements Paul Jacottet, Versailles, France

[21] Appl. No.: 408,140

[22] Filed: Aug. 16, 1982

Related U.S. Application Data

[63] Continuation of Ser. No. 159,764, Jun. 16, 1980, abandoned.

[30] Foreign Application Priority Data

Jun. 18, 1979 [FR] France ................................ 79 15483

[51] Int. Cl.$^3$ ................................................ F16F 9/18

[52] U.S. Cl. ...................................... 188/299; 188/311

[58] Field of Search ............... 188/285, 297, 299, 300, 188/311, 321; 267/118, 121, 124

[56] References Cited

U.S. PATENT DOCUMENTS 3,176,801 4/1965 Huff .................................... 188/299

*Primary Examiner*—Duane A. Reger

[57] ABSTRACT

An improved vibration jack is presented wherein the excess energy which might develop from overpressurizations and cause loss of control, is absorbed. This excess energy is transmitted to fluid within a chamber by means of an extension of the jack piston rod. Maintaining the fluid in the chamber at a constant pressure, and allowing discharge of fluid when this pressure is exceeded allows the fluid to absorb any excess energy.

7 Claims, 1 Drawing Figure

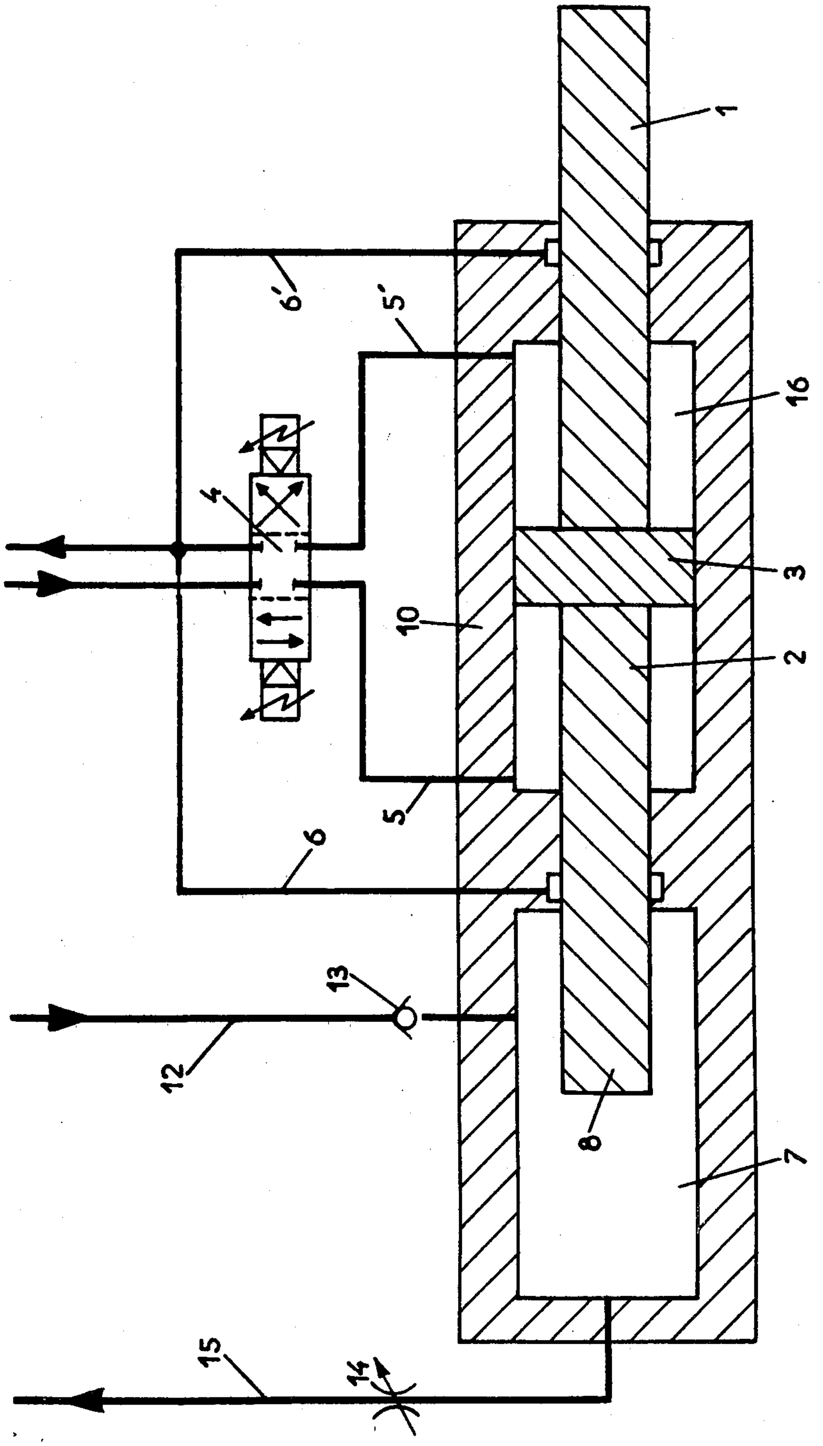
1
16
3
2
7
8
10
4
5'
6'
5
6
13
12
15
14

VIBRATION JACKS

This is a continuation of application Ser. No. 159,764, filed June 16, 1980, now abandoned.

BACKGROUND OF THE INVENTION (1) Field of the Invention

The present invention relates to the field of jacks.

Particularly the present invention relates to the field of vibration jacks which are controlled and driven by servo-valves. These jacks have a characteristic frequency which is essentially a function of the volume of the chamber or chambers, of the force developed, and of the moving mass.

(2) Description of the Prior Art

As stated above, the characteristic frequency of a jack is dependent upon thechamber volume, force developed and the moving mass. As an illustration of this dependency for a given jack, the larger the moving mass, the lower the hydraulic characteristic frequency. This hydraulic characteristic frequency dependency on chamber volume, force development and mass has disadvantages. One disadvantage is that a loss of operational control over the jack occurs with an overpressurization of the chamber or chambers. The overpressurization of the chamber is difficult to overcome, particularly at low frequencies. This difficulty is related to the hydraulic characteristic frequency dependency upon chamber volume, developed force and mass. As this frequency is lowered it develops greater energy or force. This increase in force or energy hampers the elimination of overpressurization because greater pressure is required to overcome the force.

The prior art discloses various attempts to eliminate this overpressurization. These attempts have mainly involved the increasing of the working section of the chambers. This is accomplished by putting the volumes of the chamber, which are separated by the piston, into communication with each other. While this reduces overpressurization it necessarily involves sacrificing part of the efficiency.

Accordingly, the present invention has as one of its objects the ability to reduce the overpressurization without reducing the efficiency.

Another object of the present invention is the reduction of overpressurization by absorbing the increase of energy at lower frequencies.

SUMMARY OF THE PRESENT INVENTION

The present invention overcomes the above-discussed disadvantages and other deficiencies of the prior art by providing a novel hydraulic vibration jack.

A novel hydraulic vibration jack in accordance with the present invention includes a means for absorbing the increased energy as the characteristic frequency becomes lower.

This means for absorbing the increased energy is a fluid filled chamber. The chamber is positioned so that an extension of the jack's working rod, or similar mechanism, can move co-axially within the chamber. This extension, by moving in and out of the chamber displaces fluid which is maintained at a constant pressure. The fluid is maintained at this constant pressure by either adding or removing an appropriate volume of fluid.

Any increase of energy is transmitted to the fluid of this chamber by means of the working rod extension. By maintaining the fluid in this chamber pressurized, any excess energy is absorbed before overpressurization occurs in the jack.

BRIEF DESCRIPTION OF THE DRAWINGS

The present invention will be better understood and its numerous advantages and objects will become apparent to those skilled in the art by reference to the accompanying drawing wherein:

FIG. 1 is a schematic cross-sectional side elevation view of a preferred embodiment of the present invention.

DESCRIPTION OF THE PREFERRED EMBODIMENT

Referring to FIG. 1, a first embodiment of the present invention is indicated generally at 10. As a way of illustrating the present invention, FIG. 1 depicts a servo-controlled linear vibration jack. It will become apparent to those skilled in the art that the present invention may be used with other types of vibration jacks.

Servo-controlled vibration jacks are generally driven according to the principals of a sine law. According to these principals the coordinates related to the motions of velocity and acceleration are out-of-phase. The result is that when velocity is at its maximum, acceleration is zero and vice-versa.

When translated into terms corresponding to a vibration jack, when the velocity coordinate is at a maximum, the force developed by the jack tends toward zero. The inverse also being true. As will be discussed below this following of the law of sine is related to the functioning of the present invention.

As seen in FIG. 1 the vibration jack has a housing 10. Due inherently to the way they are driven two piston rods are required, working rod 1 and guide rod 2. Both rods 1 and 2 are attached to piston 3, which is contained within chamber 16 of housing 10. The driving mechanism of the jack servo-valve distributor 4. Servo-valve distributors of the type suitable for driving vibration jacks are well known in the art. Furthermore, distributor 4 is not part of the present invention and no further discussion of distributor 4 is believed to be required.

Piston 3 has a diameter slightly smaller than the diameter of chamber 16. This allows piston 3 to reciprocate co-axially within chamber 16. Servo-valve distributor 4 delivers fluid under pressure to chamber 16 through lines 5 and 5'. Distributor 4, in conjunction with lines 5 and 5', also evacuates pressurized fluid from chamber 16. This ensures the reciprocating action of the piston 3 within chamber 16. The lines 6 and 6' are conventional elements which isolate the high pressure section from the low pressure section. Lines 6 and 5' also collect leaking fluid.

The above discussion defines a conventional linear vibration jack. The present invention involves the addition of an energy absorption means to the conventional jack.

This energy absorption means encompasses energy absorption chamber 7, rod 8 and fluid supply line 12 and fluid discharge line 15. While chamber 7 is shown as an integral piece with the casing 10 it is not essential for the present invention. This also applies for rod 8, which may or may not be a co-axial extension of rod 2.

A constant fluid pressure is maintained within chamber 7 by lines 12 and 15. The chamber 7 is supplied independently via the supply line 12. The fluid flow through line 12 is controlled by the check valve 13. Check valve 13 prevents backup of the fluid.

The volume which is delivered and maintained within chamber 7 is controlled by a throttle 14. Throttle 14 may also be adjustable nozzle mounted on the discharge line 15 to the tank. Throttle 14 controls the fluid discharge from chamber 7 through line 15. This throttle 14 only allows the flow of fluid after the fluid has obtained a desired pressure.

The present invention functions by filling and evacuating fluid from chamber 7. As rod 8 withdraws from chamber 7 fluid fills chamber 7, through rod 12 and valve 13, to maintain a pressure. As rod 8 extends into chamber 7 fluid is discharged through throttle value 14 and line 15. Excess pressure which might develop in chamber 16 of the jack is transmitted to rod 8 and is absorbed by the fluid within chamber 7. By setting throttle 14 for a specific pressure the excess pressure absorbed the fluid in chamber 7 causes fluid to be discharged through throttle 14.

As stated above the motions of velocity and acceleration are out of phase due to the fact that servo-controlled vibration jacks operate in accordance with a sine law. Fluid which is discharged through throttle 14 due to excess pressure within chamber 7, also follows a sine law. This discharge is in phase with the velocity of the jack, but is out of phase by the factor of $\pi$ with respect to the force developed by the jack. It has been shown that thecharacteristic frequency is not generated instantaneously but only over two or three alternating cycles. Thus a single-action energy absorber, operating every half-cycle, is sufficient.

While a preferred embodiment has been described and illustrated, various modifications and substitutions may be made thereto without departing from the spirit and scope of the invention.

I claim:

1. In a vibration jack, the vibration jack including a piston with two ends, the piston having a piston rod extending from at least one of said ends, the piston and piston rod reciprocating within a cylinder, the reciprocating action being controlled by a servo-valve distributor, the improvement comprising a device for absorbing energy generated when the vibration jack is operating at a frequency which is proximate to its characteristic frequency, said improvement including:

means defining a fluid chamber, the piston rod extending axially into said chamber, the piston rod having a cross-sectional area smaller than that of said fluid chamber;

means defining a pair of fluid flow passages which communicate with one of said passages being a fluid supply duct and the other of said passages being a fluid discharge duct;

throttle means disposed in said fluid discharge duct, fluid being discharged from said chamber only through said throttle means and only when the piston rod is moved in a first direction; and means disposed in said fluid supply duct for delivering fluid to said chamber via the supply duct and only when the piston rod moves in a second direction opposite to the first direction.

2. The apparatus of claim 1 wherein said chamber defining means is integral with the vibration jack.

3. The apparatus of claim 1 wherein said delivering means comprises a check valve.

4. The apparatus of claim 1 wherein said throttle means is adjustable.

5. The apparatus of claim 1 wherein piston rods extend coaxially from both ends of the piston, a first piston rod being coupled to a load and the second piston rod extending into said chamber and terminating therein and wherein said chamber defining means is integral with the vibration jack.

6. The apparatus of claim 5 wherein said delivering means comprises a check valve.

7. The apparatus of claim 6 wherein said throttle means is adjustable.

* * * * *